United States Patent Office

2,963,440
Patented Dec. 6, 1960

2,963,440

PRODUCTION OF CALCIUM HYPOCHLORITE PRODUCT AND METHOD OF MANUFACTURE

Homer L. Robson, Lewiston, N.Y., assignor to Olin Mathieson Chemical Corporation, a corporation of Virginia No Drawing. Filed Oct. 4, 1956, Ser. No. 613,839

9 Claims. (Cl. 252—187)

My invention relates to the production of calcium hypochlorite compositions containing low percentages of available chlorine which are stable, dust-free, uniform in composition and not susceptible to segregation of the components. The product is characterized in particular by particles comprising calcium hypochlorite in intimate admixture with a diluent salt and in that each particle is of substantially the same composition.

The preparation of mixtures of calcium hypochlorite and diluent salts is well-known. For this purpose, solid high test calcium hypochlorite compositions are usually mixed with inert salts or extenders, soda ash, quicklime, potassium carbonate or other anhydrous salts as diluents and modifiers. These mechanical mixtures, however, are subject to segregation in storage and shipment because of the different density of the component particles. When a portion of the material is removed from a container after storage or shipment it may differ in composition materially from other portions removed from the same container.

For household bleaches Government regulations require that the content of available chlorine be less than 10% or that in the alternative the word "Poison" appear in large letters on the package. This causes a sales resistance making it impractical to market a mixture with over 10% available chlorine. Suitable mixtures for household use avoiding the necessity of the "Poison" label have previously been prepared by mechanical mixing of calcium hypochlorite containing 70% available chlorine with diluents and modifiers to obtain a final content of about 9.5 to 9.7% available chlorine. The diluents and modifiers include polyphosphates added to sequester calcium ions, wetting agents, foaming agents, buffering agents and various inorganic salts.

Introduction of dry household bleaches based on calcium hypochlorite has shown that the manufacturer or blender cannot control the conditions under which the product is used. Directions have variously called for first dissolving the dry bleach and adding the solution to water, or for adding the dry bleach to water which is well agitated and warm, or for adding the bleach to the wash water before the clothes are added. Despite any emphasis placed on these and other directions, the consumer will frequently add the dry bleach to the washing machine after the clothes have been added. Under these conditions some particles of calcium hypochlorite may sink through the wash water and be retained in folds of cloth. In this position they may dissolve slowly with relatively little circulation of water and give rise to a small volume of liquid containing very much more available chlorine than that present in the solution around it. Calcium hypochlorite will dissolve fairly rapidly to make solutions of 50,000 or more parts per million. A 30 mesh grain of calcium hypochlorite, having a diameter of 590 microns, may provide a solution of as high as 20,000 parts per million available chlorine in a circle of cloth 1.5 mm. in diameter. If the water is at 140° F. this will not result in immediate visible damage. However, after 10 to 20 cycles of wear and washing, the fibers exposed to this strong bleach solution may disintegrate, leaving a "pinhole." If the cloth is dyed with a bleach sensitive dye, the color may be changed to white at the point where the 30 mesh particle of calcium hypochlorite was in contact with it.

Dry bleaches based on improper formulas may form lumps if a substantial amount, such as a heaping tablespoonful of the bleach, is dumped into the wash water. Once a lump has formed it may take several minutes to dissolve. Clothes contacting the surface of this lump before solution is complete may be subjected to concentrations of available chlorine in excess of 10,000 parts per million. This may result in fading of the dye over irregular areas as the lumps usually move in relation to the cloth. If such lumps become caught in folds of cloth, a large hole, perhaps a half-inch in diameter, may subsequently appear. Commonly used ingredients which may be blended with calcium hypochlorite of 70% available chlorine content, which may be classed as lump-forming when the bleach is used improperly, include sodium tripolyphosphate and sodium sulfate. Synthetic detergents are frequently blended in with dry bleach mixes and under some conditions these may contribute to lump formation.

I have now prepared a stable, dry bleaching composition of calcium hypochlorite and diluent salts which is fast dissolving, does not form lumps under adverse conditions of use, does not segregate and which greatly reduces the hazard of "pinhole" formation.

The composition of my invention comprises particles comprising calcium hypochlorite in intimate admixture with a diluent salt, the particles being of uniform size and uniform composition. The composition contains not more than about 30 percent available chlorine. Substantially all of the particles contain not more than 30 percent available chlorine and not more than about 5 percent of the particles contain more than 25 percent available chlorine. The calcium hypochlorite in each particle is distributed upon the salt in a uniform manner with no portions of the particles thicker than about 20 microns consisting of concentrated (undiluted) calcium hypochlorite. The compositions are of relatively high density; they have a minimum apparent density of about 0.7 gram per milliliter, when screened so that 90 percent passes a 30 mesh and is retained on a 70 mesh U.S. standard screen.

The compositions of my invention provide marked advantages over compositions hitherto available. My compositions contain no particles of 70 percent available chlorine as do prior compositions and thus do not have the attendant disadvantages. The calcium hypochlorite is evenly distributed throughout each particle and each particle is suitably diluted with inert salts so that "pinhole" formation hazards are greatly reduced and at the same time formulations with markedly reduced chances of lumping when dissolved are made possible. Also, physical segregation is eliminated due to the nature of the admixture of the calcium hypochlorite with the diluent salt in a particle form. The high density compositions of my invention are particularly useful in certain bleach formulations.

When my compositions containing 20 to 22 percent available chlorine and having a density of about 0.7 to 0.85 are to be further diluted with inert material, for example, flake salt having a density of 0.8 to produce compositions of lower available chlorine content, there is substantially no tendency to segregation in storage and shipping. There is much less tendency to segregation using evaporator salt or sodium sulfate having densities of 1.2 or higher when blended with my high density hypochlorite component than when the latter component has a lower apparent density, for example, 0.35 to 0.6.

The high density of my products also reduces shipping costs since it means more available chlorine is contained in a given bulk. This is especially important when the shipping container is glass or some other relatively expensive shipping container. My products also have the sales appeal that a smaller bulk has more available chlorine and more effect in bleaching than less dense hypochlorite compositions.

I have found that the novel and advantageous compositions of my invention can be prepared by admixing finely divided calcium hypochlorite, a finely divided diluent salt and water to form a plastic aqueous slurry in which the hypochlorite and salt are evenly distributed and which contains about 15 to 25 weight percent of water, preforming the plastic mixture by the application of pressure into particles comprising calcium hypochlorite in intimate admixture with the diluent salt, drying the preformed particles and screening the dried particles to free the composition from fine particles. The proportion of calcium hypochlorite and diluent salt used is such that the resulting product contains not more than about 30 percent available chlorine.

The mixing step must be of such duration and intensity to admix intimately the calcium hypochlorite and diluent salt particles to form the plastic slurry. By the term "plastic," I mean a composition comprising calcium hypochlorite and diluent salt and an amount of water appropriate to render the mass capable of being molded. I have found that the water content of the composition (slurry) must be within about 15 to 25 weight percent to provide masses capable of being molded to produce the products of my invention. The slurry is then preformed or made into small flakes or other particles approaching the dimensions desired in the finished product and dried. After drying the material is screened, crushing the oversize and sending the fines back to the mixer. Normally a fraction taken between a 30 mesh and a 100 mesh U.S. standard screen is taken, though for some purposes the coarse screen can be 40 mesh or even finer. In commercial operation the screening may not be perfect but the portion of material passing 100 mesh is normally kept under about 10%. For some mixtures these fines may be under 5%. Some specifications may call for not over 2% through 150 or 200 mesh. Fines are objectionable as they can induce lumping and delay dispersion of material when the bleach mix is dumped onto the surface of the water.

The calcium hypochlorite used in preparing the aqueous slurry can vary widely in available chlorine content, although it will generally be from about 50 to 70 percent. The relative amounts of diluent salt and hypochlorite used in preparing the aqueous slurry can also vary considerably within the scope of the invention, depending on the available chlorine content of the hypochlorite used and the available chlorine content desired in the final product.

The following preferred procedure yields a product of optimum properties. Calcium hypochlorite dihydrate crystallizes in the form of thin square plates, sometimes with the corners cut off and approaching an octagonal appearance. Because these plates are quite thin and tend to stack in layers, the material is plastic. As ordinarily prepared these plates usually range in thickness from about ¼ to two microns and in area from about 5 x 5 to about 20 x 20 microns. I prefer to use calcium hypochlorite dihydrate of these dimensions. Larger plates are less plastic. Smaller plates are more difficult to process but as long as they are essentially thin plates they are satisfactory for my use. Common salt, sodium chloride, is ordinarily used as the diluent and it constitutes a non-plastic ingredient. Methods of preforming the mixture before drying are necessarily somewhat different from those employed for the plastic calcium hypochlorite. The salt should be quite finely ground, preferably so that 98 percent by weight is finer than 20 microns with 50 percent or more by weight finer than 10 microns. When much of the salt is less than about 5 microns it tends to recrystallize more rapidly during processing to larger particles and this is a disadvantage. I thus prefer that the salt be substantially all in the range of 5 to 20 microns. This salt will mix with its saturated solution to form a smooth cream. However, it does not acquire the plasticity of moist calcium hypochlorite dihydrate crystals. If the mixing of the salt and calcium hypochlorite filter cake is inadequate, the two physically unlike ingredients will only mingle superficially. Fine salt particles will coat aggregates of calcium hypochlorite and much of the salt will be only loosely held together by the adhering mother liquor. On drying, much of the fine salt particles on the outside of the grains will dust off, forming an objectionable proportion of fines.

The calcium hypochlorite used in the preparation of the product of this invention is preferably a filter cake of crystals of calcium hypochlorite dihydrate. These crystals can advantageously constitute from 40 to 48% of the filter cake, the balance consisting of a mother liquor saturated with calcium hypochlorite and with such other material as may have resulted from the preceding operation. In addition, the liquor can be saturated or nearly saturated with sodium chloride as well as with calcium hypochlorite. A small portion of impurities, normally less than 2% can be present. Part of the calcium hypochlorite can be added as fine material of 70% or so available chlorine content, such as the material finer than 100 mesh which has been separated from commercial material. As this material may be dry, it is necessary to mix it with the filter cake and then agitate it for several minutes in order to obtain thorough hydration of the anhydrous calcium hypochlorite to the dihydrate, after which further mixing will give an even dispersion of dihydrate material. Normally the amount of dry fines added will be small and the mixture of filter cake and dry fines will be too soft to be called plastic properly. Ten minutes mixing in equipment such as a sigma blade mixer is normally sufficient to hydrate and disperse any dried fines which are added. If no dried fines are required, this mixing period can be omitted. The mixing operations required for a product containing 20% to 22% available chlorine are preferably as follows. Sufficient salt is added to the filter cake or to the mix resulting from admixture of fines and filter cake to reduce the available chlorine content on a dry basis to about 30%, while keeping the water content in the range of 22% to 24%. In this state the mix is too soft to preform. Intensive mixing, such as that provided by mulling type mixers, disperses the calcium hypochlorite dihydrate crystal plates evenly around the diluting salt crystals. Additional salt is then added so that the final test is in the desired range, such as 20% to 22% of available chlorine. This may somewhat stiffen the material so that it tends to break under deforming pressure rather than to flow and further mixing will not be as thorough. When this portion of salt is adequately mixed in, fines from a preceding batch can be added. These fines serve to adjust the water content down to the value desired for preforming, which can be as low as about 15%. As these fines are of the same composition as the mix to which they are added, on a dry basis, it is not necessary to mix them intimately into the damp material.

The plastic aqueous slurry is then preformed into particles comprising calcium hypochlorite by the application of pressure, for example by extrusion, by compressing the material into grooves cut in a drum by means of a smooth roll bearing on the grooved drum, by compression into flat sheets which are then broken by passing the plastic material between rollers, or by stamping or pressing. Such methods are described in greater detail in Robson and Petroe U.S. Patent 2,195,755, issued April 2, 1940. According to this patent, a calcium hypochlorite slurry containing 28% to 36% of water is plastic and suitable for preforming. For example, a slurry of about 30% water, 52% calcium hypochlorite and 12% salt with 6% of minor components can be preformed and dried to a high test hypochlorite product having the composition described in the patent. The slurry, however, contains all of the salt in solution and the only solid phase is calcium hypochlorite. In contrast, the slurries of the present invention have salt as well as calcium hypochlorite in the solid phase and contain only about 15% to 25% water. On preforming and drying, the product contains from about 10% to 30% available chlorine, 5% of minor diluents and the balance salt. The preforming operation firmly molds the mixture into small particles which retain their identity during subsequent handling and drying. In processing the product of the present invention, however, somewhat greater pressures than described in the patent are usually required on the rolls because of the lower plasticity of the mix are compared to mixes which will yield 70% available chlorine on drying. This can be combined with slower operation of the rolls, a greater peripheral speed difference, the use of smaller rolls, or such combinations of these effects as are sufficient to cope with the low plasticity of the mix. The preformed material is advantageously partially air dried and then dried to the required water content either in an air drier or under vacuum. I prefer to dry the preformed material in a vacuum at a pressure of about 25 to 35 mm. and at a temperature of about 70° to 100° C. Higher temperatures lead to decomposition and lower temperatures require too extended drying times. In the preferred range thorough dying can be obtained in a reasonable time with allowable decomposition.

The material of 20% to 22% available chlorine content can be blended with substantial quantities of other material, such as tripolyphosphate, diluted detergents, desiccants, diluents and other materials. After the incorporation of such additives, flake salt may be added as the principal diluent to adjust the available chlorine content to about 9.5% to 9.7% as desired.

For some blending purposes, material of lower available chlorine content is desired, for example, compositions containing about 10% to 12% of available chlorine. Very little additive is then incorporated. Flake salt can be added to bring the available chlorine content of the final mix down to the desired range, a small proportion of diluted wetting agent or detergent may be added, or a small proportion of polyphosphate, such as will provide a threshold effect when the mix is thrown into hard water. Normally from 1% to 2% tripolyphosphate is sufficient to provide this threshold effect. The proportion of active wetting or detergent agent, not usually more than about 3%, can be supplied in the commonly available 40% active form. The 10% to 12% available chlorine blend thus constitutes nearly all of the final formulation.

In preparing a material of 10% to 12% available chlorine content, it is advantageous to use dry fines of high available chlorine content. Filter cake, a slurry of calcium hypochlorite, a slurry prepared by chlorinating a mixture of calcium hydroxide, sodium hydroxide and water, or other mix containing calcium hypochlorite partly in dihydrate crystal form together with a mother liquor saturated with respect to calcium hypochlorite and containing other salts, is suitably used as the starting material. Finely ground salt is added to this in stages. Until the water content of the mix has been reduced to about 20%, good mixing may be obtained with a mulling type mixer. A sigma blade type mixer will ordinarily be effective down to a water content of about 24%. As the final mix is not very plastic, it may be desirable to preform it when it contains about 16% to 16.5% water. With heavy pressure on the rolls, however, good preforming can be obtained at 15% water content. After the mixing has been carried down to 20% water content in a mulling type mixer, the balance of the salt can be added. Preferably the final adjustment to a water content suitable for preforming is made by adding fines screened from a previous batch of the same available chlorine content on a dry basis. These fines may be roughly mixed into the batch, which may be too stiff for good mixing. The mix is then preformed, partially air dried and then further dried in one or more stages. This material is normally dried to about 0.3% or less of water. This material has a stability comparable to that of 70% available chlorine material containing from about 0.7% to 1.0% of water.

The dry material prepared in this way and containing from about 20% to 22% of available chlorine normally contains no grains with over 30% available chlorine and not more than 5% carrying 25% or more available chlorine. This can be determined by taking a closely sized screen fraction, for example, passing 40 mesh and retained on 50 mesh and suspending it in a heavy liquid medium such as may be prepared by admixture of bromoform (density 2.5) and carbon tetrachloride (density 1.6). By careful adjustment of the density of the medium, the grains high in available chlorine content sink and can be separated, washed with chloroform and analyzed. Several such separations may be required to give an estimate of the fraction of the total weight present as grains of over 25% available chlorine content. For material containing 10% to 12% available chlorine, a satisfactory product should preferably contain less than 2% of grains having over 25% available chlorine. Because of the low plasticity of the wet mix from which this product is made, a small content of grains of sodium chloride unmixed with hypochlorite may be expected. These will ordinarily not be over about 5% to 10% of the weight of the dried mix.

While sodium chloride has been described as the diluent in the above description, potassium chloride and sodium and potassium nitrates are also suitable. The nitrates are more soluble at high temperatures and this may result in slower drying and increased decomposition of the calcium hypochlorite. The final drying of these compositions is preferably done at a lower temperature than would normally be used with sodium chloride as a diluent. However, using a lower absolute pressure to correspond with the lowered drying temperature, the drying operation may not be much extended. If air drying is employed, more decomposition is to be expected with the nitrate diluted mixes.

The individual grains of the product of this invention are substantially uniform in composition. Better performance, particularly in blending with further diluents is obtained, for example, between 30 and 70 mesh, or between 40 and 100 mesh. Microscopic examination shows that the calcium hypochlorite in the dried material is distributed upon the salt in a substantially uniform manner, with no portions of concentrated calcium hypochlorite more than about 20 microns in thickness. When this product is thrown into water, the salt grains dissolve and the calcium hypochlorite portions, while dissolving rapidly, tend to disperse in the dissolving medium. At 25° C. a fraction passing 30 mesh and retained on 40 mesh and testing 20% of available chlorine dissolves in 15 to 18 seconds in mildly agitated water. Material of 10% available chlorine content dissolves in 12 to 15 seconds. At higher temperatures, such as 60° C. which are commonly used in laundry work, the rate of solution is too fast to measure. In contrast, a similarly screened fraction of 70% available chlorine material may require from 30 to 120 seconds to dissolve, depending on the brand of material tested. Further, particles of the new diluted product disintegrate during the dissolution process, while the 70% material will dissolve from the outside and thus leave a diminishing core until solution is complete. This action is important in that if a grain of 70% available material is caught in a fold of cloth in unagitated or poorly agitated laundry water, it will dissolve, remaining as a single grain during the solution, thus exposing the cloth contacting it to strong bleach liquor. A grain of my diluted product, in contrast, dissolves more rapidly and breaks up during dissolution, spreading the dissolving calcium hypochlorite over a wider area. Thus, in addition to having less available chlorine in each grain, the dissolving grain is spread over a larger area, giving more dilute solutions.

Lump formation is markedly reduced with the product of this invention. With properly formulated mixes, lumping can be substantially avoided, even with a 70% available chlorine material as the source of active bleaching ingredient. To obtain varied properties, the primary product of this invention can be combined with other materials which will not cause trouble under proper conditions of use but which may give rise to lump formation when the mix is improperly used. Such improper use is likely to occur regardless of any directions on the package. Lump forming reactions are impeded by the dilution present in each grain of the new product. As an example, if a substantial amount of tripolyphosphate is blended with 70% available calcium hypochlorite, the tripolyphosphate may dissolve and on contacting the grain of 70% calcium hypochlorite, form an insoluble coating of calcium tripolyphosphate over the grain, so that several minutes may be required for its solution. The same amount of tripolyphosphate, on contacting a grain containing only 20% calcium hypochlorite, cannot form a continuous film of the insoluble calcium tripolyphosphate. The salt particles dissolve quickly, releasing and dispersing the calcium hypochlorite. The insoluble calcium tripolyphosphate, if formed at all, appears as a slight haze in the solution rather than as a coating on slow dissolving grains. Where there are no aggregates of calcium hypochlorite over about 40 microns in thickness, coating particles resulting from the presence of tripolyphosphate in the mixture normally do not appear.

Clothes which have been washed, or which have been given a first "soak" period in home laundering, may be satisfactorily bleached with water containing about 50 parts per million of available chlorine. If the bleach is to be added with the dirty clothes, with no preliminary soak or wash period, the amount of available chlorine may be increased. Concentrations of from 100 to even 500 p.p.m. available chlorine have been recommended for such use. Normally the soil present on the clothes quickly reduces the available chlorine content. No reduction in the life of the garment or linen should be expected with contents of available chlorine under 200 p.p.m. Concentrations up to 500 p.p.m. give very minor damage which becomes serious only if this strong bleach is repeated many times, for example, during 50 to 100 washings. Cotton garments are commonly bleached from 2000 to 3000 p.p.m. of available chlorine during manufacture and such concentrations do not give visible evidence of damage. However, concentrations of 20,000 p.p.m. resulting from contact of the cloth with a lump or a slow dissolving grain may cause injury to the cloth although several cycles of wear and washing may be required for the damage to be detected.

Because of the possibility of bleach damage when dry bleaches based on 70% calcium hypochlorite are carelessly used, some dry bleaches based on organic chloramines have been introduced. An example is 1,3-dichloro-5,5-dimethylhydantoin. Such chloramines are less stable than calcium hypochlorite and the blends made from them may decrease in strength rather rapidly. Where blends based on calcium hypochlorite are germicidal and thus of high value in general household sanitation, the chloramine based preparations may be only bacteriostatic. The chloramines are unable to bleach and thus remove stains which yield to calcium and sodium hypochlorite solutions. The bleaching solutions obtained from such chloramines are frequently too weak to damage cloth in a manner evident to the housewife. The product of my invention has the stain removal power of hypochlorite solutions, while minimizing any damage to clothes that might result from misuse of this powerful bleaching agent.

The compositions of my invention will be further illustrated by reference to the following examples.

*Example I*

Materials used in this preparation were a calcium hypochlorite dihydrate filter cake containing about 45% calcium hypochlorite and 45% water; dust or fine, dried calcium hypochlorite of 72% available chlorine content and salt which had been ground to 99% through 325 mesh with about 70% by weight finer than 20 microns.

A 31 pound lot of the filter cake and 3 pounds of the dust were charged to a mulling type, intensive mixer together with 20 pounds of the finely divided salt and mixed for 7 minutes. After adding 16 more pounds of salt, the mixing was continued for four minutes. Another 10 pounds of salt were added and the mixing continued for another 8 minutes. This mix, containing approximately 18% water, was then sent through the preforming operation, partially air dried and then dried under vacuum. The dried material was screened, crushing the oversize and separating the fraction between 30 and 70 mesh (U.S. standard). This fraction analyzed 22% available chlorine and 0.25% water. It contained not over 5% by weight of grains carrying over 25% available chlorine.

*Example II*

Twenty pounds of the same filter cake as used in Example I were charged to a mulling type mixer and 20 pounds of salt and 3 pounds of water were added. After mixing for 4 minutes, another 20 pounds of the finely ground salt were added, followed by 4 minutes of further mixing. Ten pounds more salt were added and after 5 minutes mixing another 5 pounds of the salt were added followed by four minutes mixing. This gave a mix of approximately 15.5% water content. This was preformed and air dried to reduce the water content to 14.5%. It was then dried under vacuum to water content of 0.2%. The dried material was then screened, crushing the oversize and selecting the portion passing a 30 mesh screen but retained on a 100 mesh U.S. standard screen. The "fines" passing the 100 mesh screen were added to a subsequent mixer batch. The selected portion contained 12% available chlorine.

The products of my invention differ markedly from a material of similar chemical composition which has been prepared by spray drying a slurry of calcium hypochlorite and diluent salt. Spray dried particles are characterized by having a single principal void, surrounded by a wall of crystals which may be irregular in shape and may have considerable small voids. Such a product may have a minimum apparent density of 0.15 to 0.25 gram per milliliter. By methods disclosed in my co-pending application Serial No. 501,977, filed April 18, 1955, now U.S. Patent No. 2,901,435, heavier particles having thicker walls may be prepared and these may have densities in the range of 0.35 to 0.60, depending on preparation conditions. In contrast, the product of this invention will have minimum apparent densities in the range of 0.70 to 0.85 gram per milliliter when the material has been screened so that 90% passes a 30 mesh screen and is retained on a 70 mesh screen. For some formulations the higher density material is definitely preferred and its performance and packaging requirements are distinctly different as described above in more detail.

While it may seem obvious to do so, the concentration of impure solutions or slurries of calcium hypochlorite by evaporation methods has not been practiced.

If this were done, the diluent salt would tend to form large crystals, substantially larger than 40 microns and possibly exceeding 500 microns in dimension. The calcium hypochlorite and salt would tend to segregate during the evaporation and mechanical mixing of the dried product would yield material which might have grains as high as 60% available chlorine together with a large number of salt crystals and aggregates carrying very little available chlorine, such as under 5%.

If a slurry of salt and calcium hypochlorite dihydrate filter cake is dried without preforming the material, the grains will be weakly held together. In shipment and handling, they tend to break down to dust and are thus unsatisfactory. Further, extensive segregation takes place during the drying operation so that a less uniform material is obtained. The proportion of fines separated during the screening operation may be in excess of the amount which can reasonably be returned to the process. Further, drying such unpreformed material presents problems such as sticking to heat transfer surfaces, lump formation and other difficulties which make the operation unattractive from an operating viewpoint.

The process and product of this invention are thus different from and provide advantages and desirable properties not available in prior processes and compositions.

I claim:

1. A calcium hypochlorite composition of available chlorine content of not more than about 30% in the form of uniformly sized particles consisting essentially of about 14 to 43 percent of calcium hypochlorite in intimate admixture with about 86 to 57 percent of a diluent salt inert to the hypochlorite and selected from the group consisting of sodium chloride, potassium chloride, sodium nitrate and potassium nitrate, not more than about 5 weight percent of said particles carrying more than 25 weight percent available chlorine, said composition having an apparent density of at least about 0.7 gram per milliliter when screened so that at least about 90 percent passes a 30 mesh and is retained on a 70 mesh U.S. standard screen.

2. A calcium hypochlorite composition consisting essentially of uniform particles, of said particles (1) at least 90 percent by weight of the particles passing a 30 mesh and are retained on a 70 mesh U.S. standard screen, (2) at least about 95 percent by weight of the particles having between about 10 and about 30 percent of available chlorine and consisting essentially of about 14 to 43 percent of calcium hypochlorite and correspondingly 86 to 57 percent of a diluent salt selected from the class consisting of sodium chloride, potassium chloride, sodium nitrate and potassium nitrate, and (3) not more than 5 percent by weight of the said particles carrying more than 25 percent by weight of available chlorine; said composition having an apparent density of at least 0.7 gram per milliliter when screened so that at least about 90 percent passes a 30 mesh and is retained on a 70 mesh U.S. standard screen.

3. A calcium hypochlorite composition consisting essentially of uniform particles, of said particles (1) at least 90 percent by weight of the particles passing a 30 mesh and are retained on a 70 mesh U.S. standard screen, (2) at least about 95 percent by weight of the particles having between about 10 and about 30 percent of available chlorine and consisting essentially of about 14 to 43 percent of calcium hypochlorite and correspondingly from about 86 to 57 percent of a diluent salt selected from the class consisting of sodium chloride, potassium chloride, sodium nitrate and potassium nitrate, (3) not more than 5 percent by weight of said particles carrying more than 25 percent available chlorine, and (4) any portion of said particles consisting of undiluted calcium hypochlorite being of less than about 20 microns in thickness; said composition having an apparent density of at least about 0.7 gram per milliliter when screened so that at least about 90 percent passes a 30 mesh and is retained on a 70 mesh U.S. standard screen.

4. A calcium hypochlorite composition consisting essentially of uniform particles, of said particles (1) at least 90 percent by weight of the particles passing a 30 mesh and are retained on a 70 mesh U.S. standard screen, (2) at least about 95 percent by weight of the particles having between about 10 and 22 percent of available chlorine and consisting essentially of about 14 to 43 percent of calcium hypochlorite and correspondingly from about 86 to 57 percent of sodium chloride, (3) not more than 5 percent by weight of said particles carrying more than 25 percent by weight of available chlorine, and about 90 percent of said particles having an apparent density of at least about 0.7 gram per milliliter when screened so that at least about 90 percent passes a 30 mesh and is retained on a 70 mesh U.S. standard screen.

5. A calcium hypochlorite composition of available chlorine content of not more than about 30 percent comprising uniformly sized particles consisting essentially of about 14 to 43 percent calcium hypochlorite in intimate admixture with about 86 to 57 percent of a diluent salt inert to the hypochlorite and selected from the group consisting of sodium chloride, potassium chloride, sodium nitrate and potassium nitrate, not more than 5 weight percent of said particles carrying more than 25 weight percent available chlorine, said composition having an apparent density of at least about 0.7 gram per milliliter when screened so that at least about 90 percent passes a 30 mesh and is retained on a 70 mesh U.S. standard screen.

6. A method for preparing a calcium hypochlorite composition which comprises admixing from about 14 to 43 parts by weight of finely divided calcium hypochlorite, and from about 86 to 57 parts by weight of a diluent salt selected from the group consisting of sodium chloride, potassium chloride, sodium nitrate and potassium nitrate, substantially all the particles in said salt in the range of about 5 to 20 microns, with water in amount sufficient to form a plastic aqueous slurry containing about 15 to 25 percent by weight of water in which the salt and hypochlorite are evenly distributed and in which the solid phase contains salt and calcium hypochlorite, preforming the plastic slurry under pressure into particles substantially free from fines, drying the preformed particles, and screening the particles to obtain a composition having a density of at least about 0.7 and at least about 90 percent by weight of the composition passes a 30 mesh and is retained on a 70 mesh U.S. standard screen.

7. The method of claim 6 in which at least part of the calcium hypochlorite used in preparing the aqueous slurry is a filter cake of calcium hypochlorite dihydrate crystals.

8. A method for preparing a calcium hypochlorite composition which comprises admixing from about 14 to 43 parts by weight of finely divided calcium hypochlorite, and about 86 to 57 parts by weight of finely divided sodium chloride diluent salt, substantially all the particles in said salt in the range of about 5 to 20 microns, with water in amounts sufficient to form a plastic aqueous slurry containing about 15 to 25 percent by weight of water in which the salt and hypochlorite are evenly distributed and in which the solid phase contains salt and hypochlorite, preforming the plastic slurry under pressure into particles substantially free from fines, drying the preformed particles and screening the particles to obtain a composition having a density of at least about 0.7 and at least about 90 percent by weight of which passes a 30 mesh and is retained on a 70 mesh U.S. standard screen.

9. The method of claim 8 wherein the particles are dried in a vacuum at a temperature of about 70° to 100° C.

References Cited in the file of this patent

UNITED STATES PATENTS

| | | |
|---|---|---|
| 647,295 | Ernst et al. | Apr. 10, 1900 |
| 2,121,501 | Hershman | June 21, 1938 |
| 2,195,755 | Robson et al. | Apr. 2, 1940 |
| 2,195,757 | Robson et al. | Apr. 2, 1940 |
| 2,219,660 | Robson et al. | Oct. 28, 1940 |
| 2,590,794 | Robson | Mar. 25, 1952 |
| 2,640,028 | Robson | May 26, 1953 |
| 2,693,454 | Soule | Nov. 2, 1954 |
| 2,695,274 | MacMahon | Nov. 23, 1954 |
| 2,753,241 | MacMahon | July 3, 1956 |
| 2,806,765 | Robson et al. | Sept. 17, 1957 |
| 2,820,767 | Robson | Jan. 21, 1958 |